United States Patent

[11] 3,593,051

| [72] | Inventor | Samy Akbar<br>Berliner-Strasse 13-14, 1000 Berlin 31, Germany |
|---|---|---|
| [21] | Appl. No. | 6,914 |
| [22] | Filed | Jan. 29, 1970 |
| [45] | Patented | July 13, 1971 |

[54] ELECTRIC MOTOR
13 Claims, 6 Drawing Figs.

[52] U.S. Cl. ................................................. 310/166
[51] Int. Cl. ........................................... H02k 17/00
[50] Field of Search ........................................ 310/144, 147, 166, 210, 212, 172

[56] References Cited
UNITED STATES PATENTS
544,261  8/1895  Lundell ..................... 310/166

*Primary Examiner*—D. X. Sliney
*Attorney*—Watson, Cole, Grindle & Watson

ABSTRACT: An induction motor is disclosed having a rotor part energized with alternating current to provide two alternating flux emitting areas or poles. The stator has its inner annular portion formed as a series of closely spaced poles spaced form one another by nonmagnetic gaps, and having the sides of pole shoe loops embedded in their surfaces facing the rotor. The root portions of the stator poles are flanked by the sides of pole loops which are interconnected with the pole shoe loops to provide closed electrical circuits providing the secondary winding of the machine. The spans of the pole shoe loops and the pole loops and their form of interconnection is such that when the rotor winding is energized the currents which flow in the secondary winding produce a relatively high starting torque. The positions of the windings on the rotor/stator may be reversed.

Inventor:
Samy Akbar

ELECTRIC MOTOR

BACKGROUND OF THE INVENTION

Most motors working on the principal of magnetic induction have a relatively poor starting torque. Their full load torque is normally only obtained in the synchronous speed range of the motor.

SUMMARY OF THE INVENTION

The subject invention is directed towards providing an induction type AC motor which has a primary winding and a secondary winding, but which unlike the prior art constructions, have a relatively high starting torque and, a priori, is not restricted to any synchronous range. This result is obtained by arranging the primary winding on a support, providing a number of $2p$ poles, and the secondary winding on a second support providing $2kp$ slotted poles. Each secondary winding consists of a number of pole shoe ring coils which are embedded in pole shoe slots of the $2kp$ secondary poles and have a coil or loop width equal to the primary pole pitch, the secondary winding also including a number of $2kp$ pole coils which are each wound around one or more cores or roots of the secondary poles and are so electrically connected with the pole shoe ring coils or loops that the pole loop and pole shoe loops that are electrically connected are mainly those which are offset by 90° $e$ with respect to one another in relation to the primary magnetic field.

Advantageously, the rotor supports the primary winding, the number of poles of which is designated as $2p$ and the stator is formed from an annular core which has a number of generally $2kp$ internal poles which are made salient in such manner that they are separated successively from one another by slots and provide a ring of closely spaced pole shoes providing to an inner pole shoe ring around the rotor, the ring being divided by the slots. The thickness of the ring is so dimensioned that the primary induction flux can pass from one pole shoe to the next partially or predominantly via the radial slots so that the flux can traverse a magnetic circuit which includes portions of the pole shoe ring.

The factor $k$ determines the number of secondary poles in excess of the primary poles, and is a multiple of the primary poles.

It is advantageous for the primary winding and the secondary winding to be constructed as a rotor and as a stator winding respectively. In this way it is possible for the direction of rotation of the motor to be changed easily.

In an alternative arrangement the primary winding is constructed as a $2p$ pole stator winding. In this case, the rotor is the support for the secondary winding and most suitably is constructed as a drum having a number of $2kp$ salient outer poles whose slotted closely successive pole shoes form an outer pole shoe ring around the drum, the ring being divided by the radial slots between the pole shoes and being of a thickness and dimension that the primary induction flux emanating from the stator passes from one pole shoe to the next partially or predominantly via the radial slots formed between the pole shoes in order to traverse a magnetic circuit which includes portions of the pole shoe ring.

The secondary winding carried by the drum is formed from a number of pole shoe ring loops which are embedded in slots provided in the faces of the pole shoes opposite the stator on the $2kp$ secondary poles. The pole shoe ring loops have a span equivalent to the primary pole pitch and, in addition, are electrically connected with a number of pole loops which are each wound around one or more of the roots or pole cores and which are electrically connected to them either singly or in pairs, in a parallel or series circuit. The pole loops are preferably electrically connected to those pole shoe ring loops whose coil sides are embedded in the middle pole shoes of the wound pole roots or cores. In this way the pole loops and the pole shoe ring loops that are electrically connected are mainly those which are offset by 90° $e$ in relation to one another with respect to the primary poles. The number of turns of the pole loops and the pole shoe ring loops depends on the nature of the construction and in a special case may be equal to unity.

The secondary winding can be regarded as a number of electrical circuits in which there are as many electromotive forces operative as there are pole loops and pole shoe ring loops connected to them.

Other objects and advantages will appear from the following description of an example of the invention, when considered in connection with the accompanying drawings, and the novel features will be particularly pointed out in the appended claims.

IN THE DRAWINGS

FIG. 1 is a section through a rotor and a stator of an induction-type motor constructed in accordance with the invention;

FIG. 2 explains electrical connections of the motor stator;

DESCRIPTION OF PREFERRED EMBODIMENT

The motor illustrated in all of the drawings is shown in diagrammatic cross section, that is to say at right angles to the rotor shaft.

Figure 1:
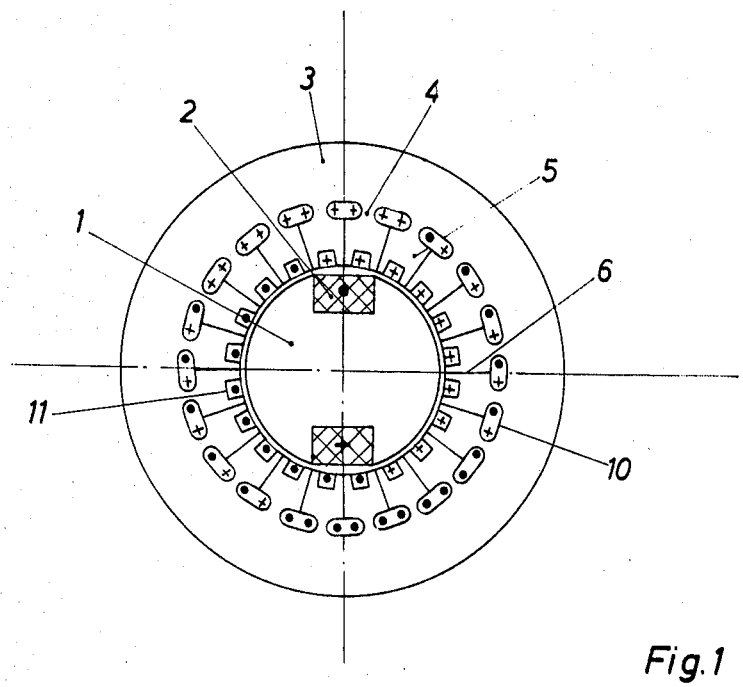

The motor of FIG. 1 has a stator providing a magnetic circuit and consisting of an outer ring 3 from which 20 inwardly directed pole shoes 5 extend toward the peripheral surface of a rotor 1. The pole shoes 5 are separated by radial gaps 6 so that they form together a divided inner pole shoe ring. The poles 5 have root portions or cores 4 which connect them to the outer ring 3.

The rotor 1 carries a primary winding 2 providing two poles. The 20 poles on the stator are so called because of their shape and not because of their functional operation in accordance with the conventional idea of alternating north and south poles as one customarily expects with rotating electrical machinery.

The pole roots 4 are flanked by conductors of pole loops 10 of the secondary winding and the faces of the pole shoes 5 opposite the rotor have embedded in them, in slots, opposite sides of pole shoe ring loops 10 of the secondary winding.

Figure 2:
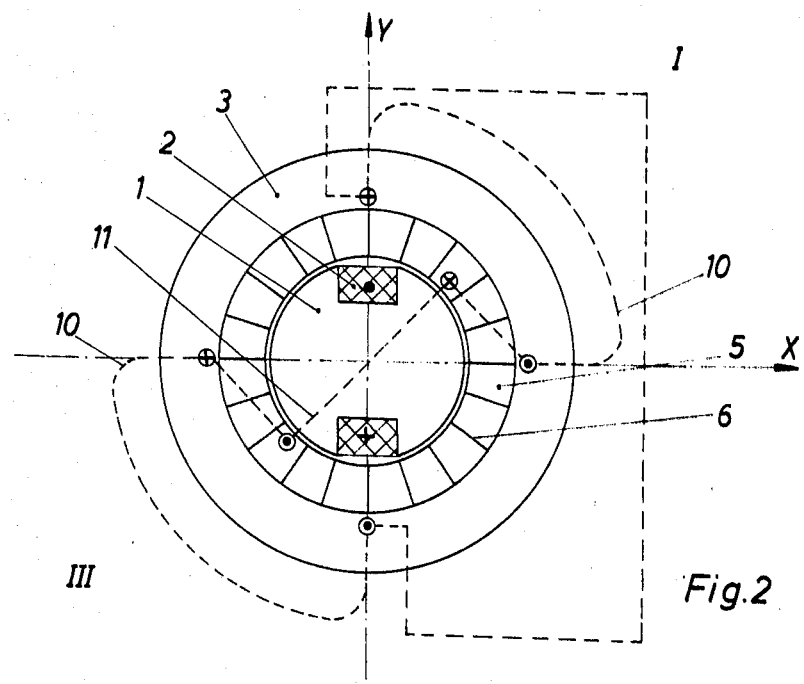

The motor can be illustrated symbolically, as shown in FIG. 2, by the rotor 1, the pole shoe ring consisting of the pole shoes 5, and the outer ring 3. The primary winding 2 is connected to an alternating current supply via two slip rings (not shown).

The secondary circuitry of the motor is composed of a number of closed circuits, each consisting of a pole shoe ring loop 11, the sides of which are embedded in two pole shoe slots, with a span equal to the primary pole pitch; and two pole loops 10 which are each wound around five of the secondary poles 5 with a span equal to half the primary pole pitch. The two pole loops 10 are offset in relation to one another by an amount equal to the primary pole pitch and they are also offset in relation to the pole shoe ring loops 11 to which they are connected by half the primary pole pitch. The broken lines indicate the connections between the loops 10 and 11 and also their spans.

Thus in this example each secondary electric circuit consists of a complete pole shoe ring loop 11 and two half loops formed respectively by the two pole loops 10.

The secondary winding can be regarded as a two-part winding, one part being born by the ring of pole shoes 5 and the other part by the outer ring 3.

The behavior of the motor depends on the way in which the elements of the two winding parts are connected. In FIG. 2 are shown two mutually perpendicular planes referenced X and Y and which are considered as being fixed in relation to the rotor shaft so that they rotate with it and effectively divide the cross sections of the stator illustrated into four quadrants each of which bounds have of the primary pole pitch, i.e. $180° e$ or a quarter of a revolution of the primary field bearing in mind that a two pole rotor is illustrated.

At the time $t$ in the rotation of the rotor and thus the planes X and Y, all of the loops shown in FIG. 2 lie in the quadrants I and III. The loops are connected in series as indicated by the broken line and thus form a closed electrical circuit in which electromotive forces $e_p$ and $e_s$ are induced in each pole loop 10 and in the pole shoe ring loop 11, respectively, by the primary alternating field from the rotor.

The other pole loops 10 and pole shoe ring loops 11 are identically connected electrically, in sequence, so that a number of closed electrical circuits are formed which are identical in respect of their elements and arrangements, and these circuits together form the secondary winding.

Since the two pole loops 10 are offset in relation to one another by an amount equal to a half revolution of the primary field, the two electromotive forces $e_p$ of the pole loops 10 always remain connected in series irrespective of the direction of rotation of the rotor or its position. Also, the electromotive forces $e_p$ change their direction simultaneously.

Since the pole shoe ring loop 11 is offset in relation to the two pole loops 10 by an amount equal to a quarter revolution of the primary field, the electromotive force $e_s$ produced by the pole shoe ring loop 11 acts alternately in series with or in opposition to the electromotive force $e_p$ of the two pole loops 10. This interaction recurs four times in each revolution of the rotor. This means that when the electromotive forces $e_p$ and $e_s$ act in series as in the quadrants I and III, they act in opposition to one another in the same regions of the quadrants II and IV. This produces a high torque in starting as will be understood from the behavior of the secondary windings discussed below.

Figure 3:
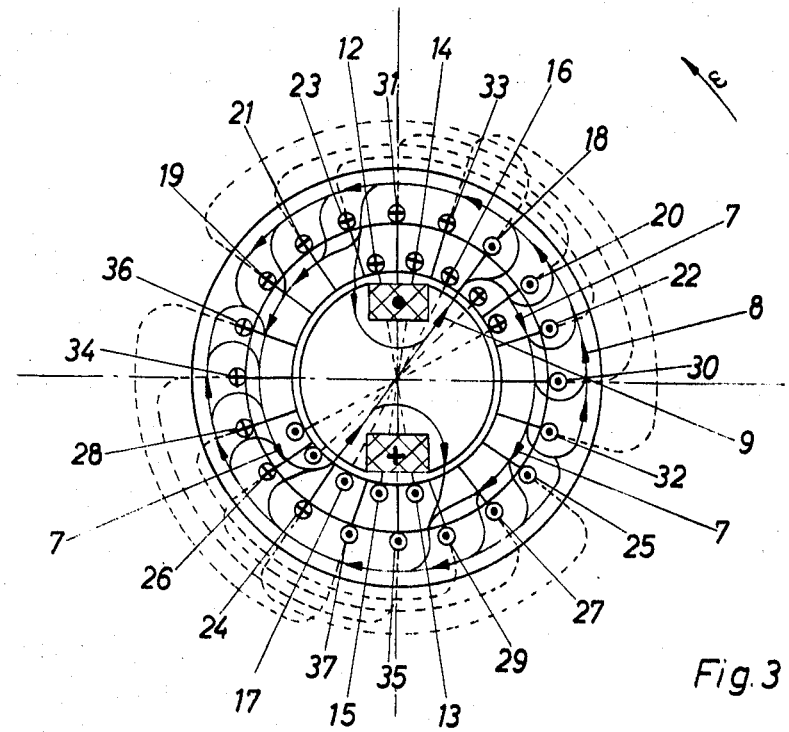
FIG. 3 shows the electrical circuitry and flux paths produced by currents flowing in it, during starting, the circuitry illustrated being one half only of the secondary winding of the motor.
Figure 4:
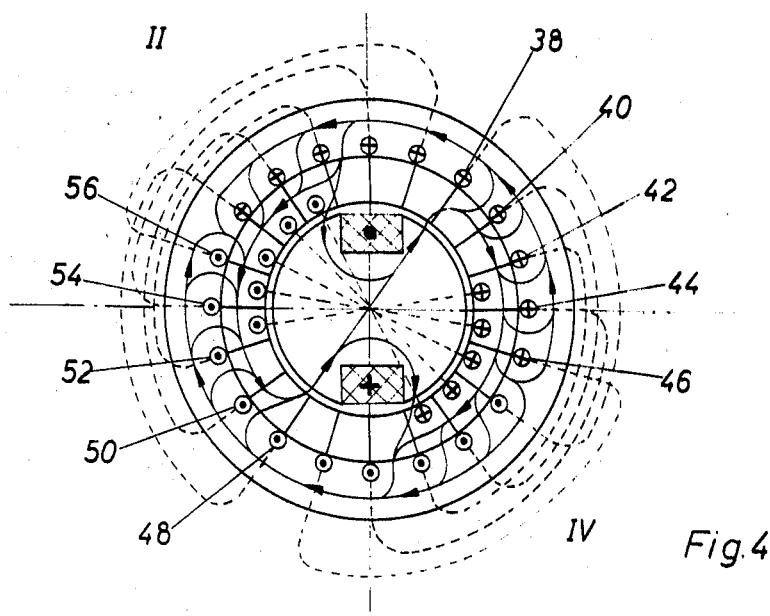
FIG. 4 is a view corresponding to FIG. 3 but showing the electrical connections, current paths and the flux paths resulting from the other half of the stator secondary winding.

FIGS. 3 and 4 illustrate the different behavior of the electromotive forces $e_p$ and $e_s$. Each of these Figures shows a different half of the secondary winding which consists of 10 electrical circuits. Both FIGS. 3 and 4 show the paths of magnetic lines of force which result from the currents induced by the electromotive forces in the secondary windings illustrated and in the absence of the secondary windings shown in the other Figure. The interconnection of the electrical circuits of the secondary winding are as explained in detail and illustrated above with reference to FIG. 2.

FIG. 3 shows a set of five pole shoe ring loops which are subjected to the inductive influence of the primary field from the rotor predominantly in the region of the quadrants I and III and which are each connected to a top pole loop, as it appears in the FIGURE, and a bottom pole loop, as it appears in the Figure, to form an electrical circuit. These electrical circuits are distinguished by the fact that the electromotive forces $e_p$ induced in their pole loops readily change their direction on rotation of the rotor in the direction ω or as the pole loops progressively change their position from the quadrant II to the quadrant I, in order to cooperate in the desired manner with the electromotive forces $e_s$ of the pole shoe ring loops.

The remaining pole shoe ring loops are shown in FIG. 4 and form a second set which are subject to the induction of the primary flux predominantly in the region of the other quadrants II and IV. Each of the pole shoe ring loops in FIG. IV is associated with a left-hand pole loop, as appears from the Figure, and a right-hand pole loop, as appears from the Figure, to form electrical circuits which are distinguished from the preceding circuits illustrated in FIG. 3 in that the electromotive forces $e_s$ of the pole shoe ring loops 11 act in opposition to the electromotive forces $e_p$ of the pole loops 10 after passing from the quadrant I to the quadrant IV.

OPERATION

The cooperation of the two part windings shown respectively in FIGS. 3 and 4 produces an increased torque M as follows:

The maximum electromotive forces $e_s$ induced by the primary alternating field and resulting in correspondingly high current in the secondary windings are operative in the pole shoe ring loops 10 shown in FIG. 3 whose sides 12, 13, 14, 15, 16 and 17 are situated in the immediate vicinity of the primary winding 2 on the rotor. These secondary currents also flow through the six connected pole loops whose sides are denoted by the reference numerals 18, 19, 24, 25, 20, 21, 26, 27, 22, 23, 28, and 29 in the sequence of their association with the above pole shoe ring loops. They produce a close interlinking of the primary flux to the six pole loops so that the primary lines of force extend circumferentially of the pole shoe ring in the direction of the arrow 7 in accordance with the sign of the participating currents in the conductors which are illustrated with conventional notation, current towards the reader in a conductor being signified by a dot and current away from the reader being signified by a cross. As a result of the interlinking of the primary flux with the immediately adjacent pole loops whose sides are indicated by the reference numerals 30, 31; 34, 35; 32, 33; and 36, 37 this process is intensified by the fact that the electromotive forces $e_p$ of these pole loops, being in quadrants I and III, are in series with the electromotive forces $e_s$ of the pole shoe ring loops connected to them.

As a result of the interlinking of the pole loops, for example by the sides 18 and 38, 20 and 40, and so forth, the pole loops in FIG. 3 and the pole loops in FIG. 4, are tightly coupled together magnetically in pairs so that as a result of the above described path of the magnetic flux of the primary winding a strong inductive effect is produced in the last-mentioned pole loops and a correspondingly high current occurs in them.

If the same reference numerals as are used to denote the loop sides are also used for the currents flowing through the loops, it will be seen that the negative current 18, 20, 22, 30 and 32 in FIG. 3 induce secondary currents of the opposite polarity in the loops shown in FIG. 4 whose sides are indicated by the references 38, 40, 42, 44 and 46.

The positive currents 24, 26, 28, 34 and 36 in FIG. 3 have a similar inductive effect on the pole loops in FIG. 4 whose sides are denoted by references 48, 50, 52, 54 and 56, and the currents of which, of course, have the opposite sign.

This results in the transmission of electrical energy from one-half of the secondary winding to the other.

As an iron core, the pole shoe ring ensures that the energy transmission is possible inside the secondary winding by the action of the primary induction flux in the direction of the arrows 7. The slots 6 between adjacent poles in the pole shoe ring are necessary to give high starting currents for a high starting torque.

In contrast to well-known polyphase motors, in which relatively large ohmic resistances have to be used to develop corresponding starting torques, the above described induction motor requires a predominantly higher inductive current for the same purpose and which is provided by the radial slots 6 in the pole shoe ring. The currents which flow through the pole shoe ring loops and the oppositely directed current in the adjacent portion of the primary winding generate a twisting torque on the rotor in much the same way as a series wound motor.

The effective output is much the same as in the case of a series wound machine and results from the reaction of the electromotive force of movement. With increasing speed of the rotor the electromotive force $e_s$ of the pole shoe ring loops produce a diminishing influence. Thus the magnetic coupling between the two halves of the secondary winding is loosened by degrees so that at the rated speed of the motor, it has only a slight effect.

Figure 6:
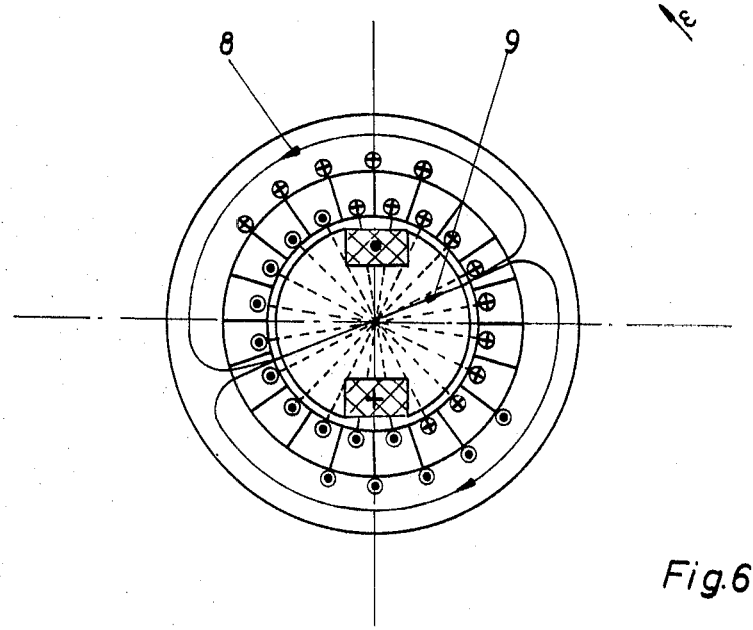

In consequence, the path of the primary flux through the pole shoe ring diminishes progressively with increasing speed of the rotor, the magnetic flux preferring instead the magnetic circuit through the outer ring as is shown in FIG. 6. Indeed, at the rated speed of the motor the magnetic flux path through the stator is virtually entirely confined to the outer ring and the pole axes and only a negligible quantity jumps the interpole slots of the pole shoe ring.

This effect and the construction of the individual circuits of the secondary winding ensures that the pole loops come under the direct influence of the primary magnetic flux so that the electromotive force $e_p$ operates independently of the electromotive force $e_s$ in the production of secondary currents which are predominantly energy currents.

The primary current drawn by the motor requires in addition to the energy current to provide the mechanical output of the motor, a quadrature or magnetizing current to drive the primary flux through the airgap between the rotor and the stator.

Figure 5:
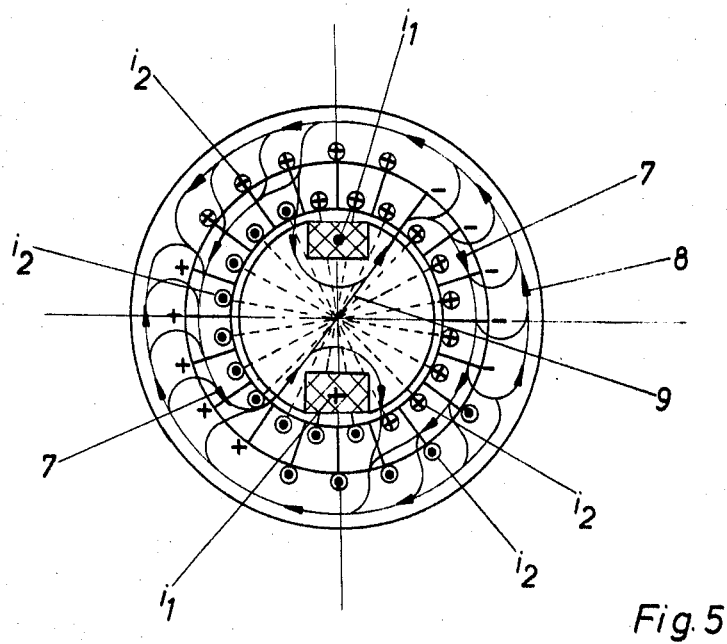
FIG. 5 shows the aggregate flux effect occurring during starting, of the two halves of the secondary winding shown in FIGS. 3 and 4 respectively, and FIG. 6 the flux paths to the motor when the machine is running at its operating speed, that is to say after the starting period.

The interlinked coupling of the pole shoe ring loops and the pole loops are the prerequisite to inductive processes in which the interaction of the electromotive forces $e_p$ and $e_s$ are to produce a current pattern as shown in FIGS. 3 and 4. This pattern is distinguished in that the pole loop currents flowing predominantly in the regions of the quadrants I and III have the opposite signs in pairs and thus produce a difference effect. If the difference effect and the consequential reduced currents are disregarded as far as the absolute values of the secondary currents are concerned, then FIGS. 3 and 4 give the overall pattern shown in FIG. 5 in which the primary current is referenced $i_1$ the secondary currents are referenced $i_2$ and the lines of force extend in the directions of the arrows 7, 8 and 9.

It will be apparent that the secondary winding consisting of the pole and pole shoe ring loops behaves like the secondary winding of a transformer and the useful winding of a commutator motor, whose cooperation with a primary winding satisfies all of the requirements to give a torque M.

In the working speed range of the motor the magnetic lines of force from the primary winding follow predominantly the direction of the arrows 8 and 9 as shown in FIG. 6.

I claim:

1. An alternating current motor having a rotor part and a stator part, a primary winding providing $2p$ primary poles on one of said parts, alternating current terminals connected to energize said primary winding, $2kp$ slotted poles on the other of said parts and connected thereto by root portions, pole shoes provided on said slotted poles and facing said one part across an airgap, said slotted poles forming a pole shoe ring in which individual pole shoes are spaced from one another by radial nonmagnetic gaps, a secondary winding on said other part, pole shoe ring loops forming part of said secondary winding and each having a span equal to a primary pole pitch and sides embedded in respective pole shoe pole loops also forming part of said secondary winding and having their sides lying between said slotted poles adjacent their root portions, the secondary winding being composed of groups of pole and pole shoe loops so interconnected that the pole loop axes are offset by a quarter cycle of the primary magnetic field in relation to the axes of the pole shoe loops to which they are connected.

2. A motor as claimed in claim 1, in which said one part comprises the rotor and said other part comprises the stator.

3. A motor as claimed in claim 1, in which each pole loop has a span of half the primary pole pitch.

4. A motor as claimed in claim 1, in which the pole shoe loop axis is offset in relation to the pole loops of the same group and opposite sides of the pole ring loop lie within the spans of the pole loops to which it is connected.

5. An induction motor having a low magnetic reluctance rotor, a primary winding on said rotor, electrically connections feeding an alternating circuit electrical supply to said primary winding on said stator, $2p$ poles provided on said rotor by said primary winding, an annular stator having low magnetic reluctance surrounding said rotor so that a narrow airgap is defined between said stator and said rotor, a continuous ring forming the annular outer section of said stator and a plurality of spaced poles forming a radially divided annular section of said rotor, narrow nonmagnetic radial slots separating said spaced poles which have root portions attached to said continuous ring, pole shoes on said poles and facing said rotor, a secondary winding on said stator, pole shoe loops having sides embedded in said pole shoes forming part of said secondary winding, pole loops having sides embracing said poles and lying therebetween adjacent said root portions, and electrical connections dividing the secondary winding into groups each containing pole and pole shoe loops having their axes offset circumferentially around the stator with respect to one another whereby during starting of the motor the primary magnetic flux passes largely via the inner section of the stator during starting so as to traverse the interpole slots whereas when the motor is running at its rated speed range the primary magnetic flux travels predominantly radially and circumferentially of the stator.

6. A motor as claimed in claim 5, in which said pole ring loops have a span equal to one primary pole pitch, said pole loops have a span equal to half a primary pole pitch, the axis of each pole ring loop is offset half a primary pole pitch in relation to the axes of two pole loops to which it is connected and which lie on diametrically opposite sides of the stator.

7. A motor as claimed in claim 6, in which opposite sides of each pole ring loop lie centrally within the coil span of respective pole loops to which it is connected.

8. A motor as claimed in claim 7, in which the rotor has two nonsalient primary poles and the stator has twenty similar poles symmetrically arranged with radial airgaps between them.

9. AC motor according to claims 8, characterized in that the primary winding is disposed on the rotor so that the stator is formed as a support for the secondary winding from an annular core which has a number of $2kp$ internal poles whose slotted closely successive pole shoes form an inner ring pole shoe ring around the rotor, the said ring being divided by the pole shoe intervals, and its thickness being of such dimensions that the primary flux can pass from one pole shoe to the next partially or predominantly by the radial gaps formed by the pole shoe intervals in order to traverse a magnetic circuit which includes portions of the pole shoe ring.

10. AC motor according to claims 8, characterized in that the primary winding is accommodated in the stator, so that the rotor is formed as the support for the secondary winding from a drum which has a number of $2kp$ salient outer poles whose slotted closely successive pole shoes form an outer ring, pole shoe ring, around the drum, said ring being divided by the pole shoe intervals and having a thickness of dimensions such that the primary induction flux can pass from one pole shoe to the next partially or predominantly by the radial gaps formed by the pole shoe intervals in order to traverse a magnetic circuit which includes portions of the pole shoe ring.

11. An induction type AC motor having a primary winding and a secondary winding, characterized in that in a primary winding, whose support comprises a number of $2p$ poles, the secondary winding, whose support has $2kp$ slotted poles consists of a number of coils or pole shoe ring coils which are embedded in the pole shoe slots of the $2kp$ secondary poles with a width equal to the primary pole pitch, and of a number of pole coils which are wound around one or more pole cores, and are electrically connected, singly or in pairs, in a parallel or series circuit, preferably to those pole shoe ring coils whose coil sides are respectively embedded in middle pole shoes of the wound pole cores so that the pole and pole shoe ring coils that are electrically connected are mainly only those which are offset by a quarter-cycle in relation to one another in the primary magnetic field.

12. AC motor according to claim 11, characterized in that the pole coils have a width equal to half the primary pole pitch and are connected in pairs, with an offset equivalent to the primary pole pitch in relation to one another in series with a pole shoe ring coil which is offset in relation to the pole coils by about half a primary pole pitch.

13. AC motor according to claims 11, characterized in that the pole coils and pole shoe ring coils consist of loops.